April 11, 1967 R. H. KELSEY ETAL 3,313,991
VARIABLE CAPACITOR
Filed Dec. 6, 1965 2 Sheets-Sheet 1
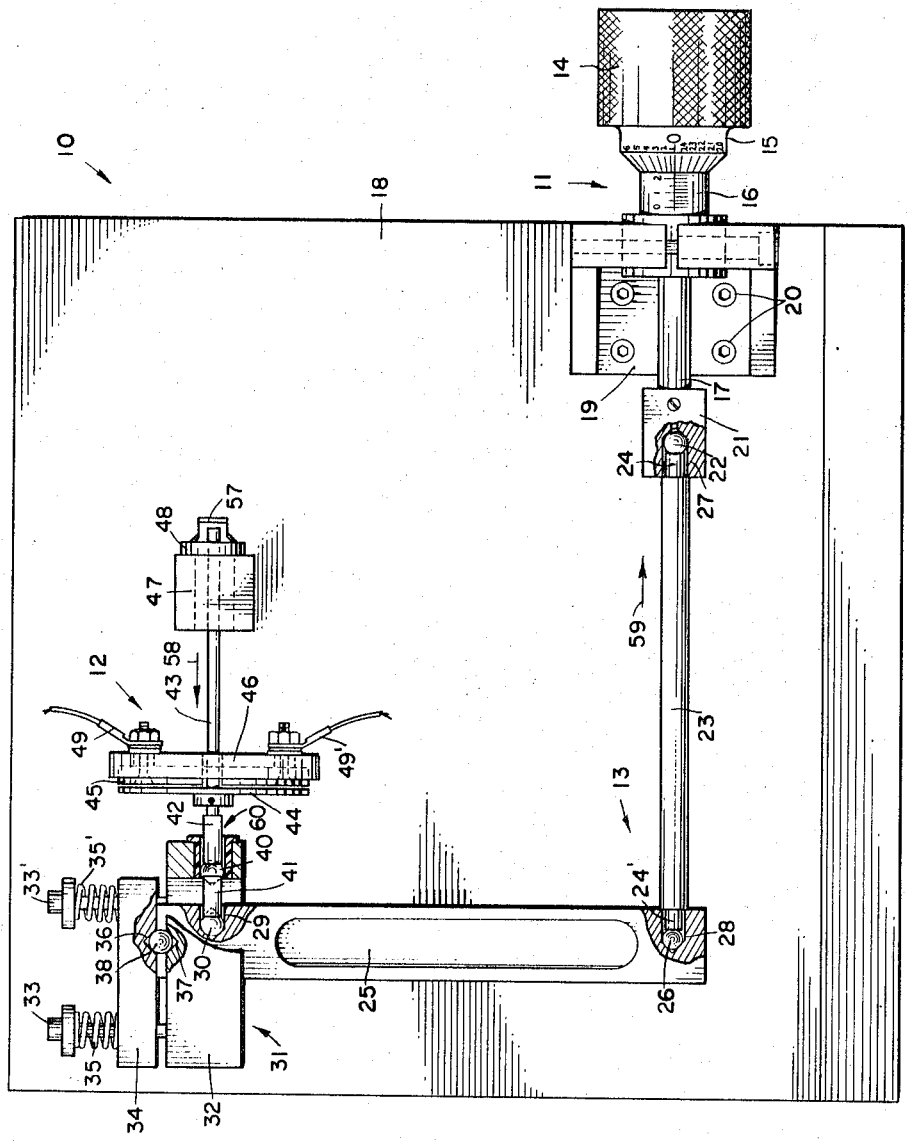
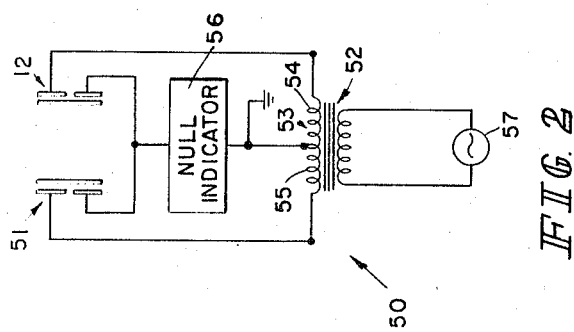
INVENTORS
ROBERT H. KELSEY
HANS R. CAMENZIND
BY
ATTORNEY

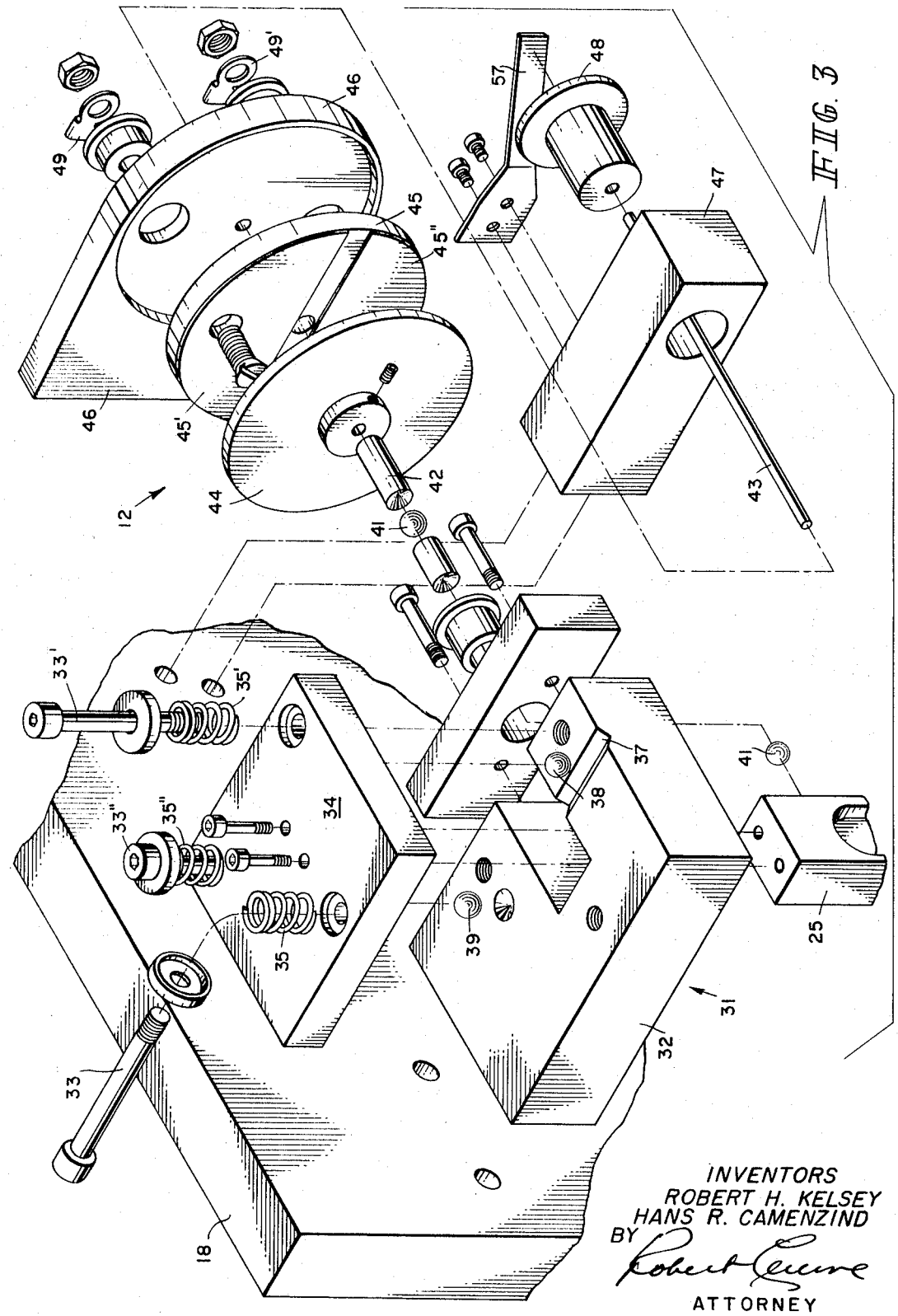

United States Patent Office 3,313,991
Patented Apr. 11, 1967

3,313,991
VARIABLE CAPACITOR
Robert H. Kelsey, West Acton, and Hans R. Camenzind, Lexington, Mass., assignors to P. R. Mallory & Co. Inc., Indianapolis, Ind., a corporation of Delaware
Filed Dec. 6, 1965, Ser. No. 511,705
10 Claims. (Cl. 317—255)

The present invention relates to a read-out device for tensile testers, and has particular relevance to electromechanical means and methods for ascertaining the elongation of fibers and, in particular, metallic whiskers, without the use of a precision bridge means and the cumbersome use of conversion tables that convert a dial reading of an electrical value such as capacitance, or the like, to alterations in the fiber or the whisker length.

Various tensile testing devices are known in the prior art for ascertaining the tensile strength and the elongation of fibers or whiskers prior to the fracture thereof. Generally, presently available devices utilize a movable clamp and a fixed clamp between which a fiber or whisker to be tested is extended. The movable clamp is cooperatively associated with the plates of a capacitor. Generally, the capacitor is an integral component of a precision electrical bridge network. When a predetermined condition is established on the electrical bridge, and thereafter the predetermined condition is altered to an unknown condition by a change in the value of the capacitance of a capacitor, a meter reading is taken between opposite arms of the bridge to ascertain the value of electrical current flowing therebetween. In this instance the electrical current is directly proportional to the change in value of the capacitance of the aforementioned capacitor and hence directly proportional to the elongation of the metallic whisker. The alteration in capacitance of the capacitor is ascertained on an appropriate indicating means such as a meter or the like. However, merely knowing the value of the change in capacitance of the capacitor is meaningless unless reduced by a conversion table, a chart or by actual mathematical calculation to meaningful information such as the change in length of the fiber or whisker. The present invention contemplates the use of a basically simpler and less expensive means that performs the function of a precision bridge, but reads the alterations in fiber or whisker length directly, without the necessity of referencing the reading obtained from a bridge to conversion tables or to mathematical computation in order to obtain more meaningful information.

Therefore, it is an object of the present invention to provide a read-out means for use with a micro-fiber tensile tester that indicates alterations in fiber length directly thereby eliminating the necessity of referring to conversion tables or to mathematical computation.

Another object of the present invention is to provide a read-out means for use with a micro-fiber tensile tester that utilizes a simple capacitance bridge that is balanced by a variable read-out capacitor mechanically coupled to a micrometer that reads directly the change of length of a fiber under test consideration.

Yet another object of the present invention is to provide a read-out means for utilization with a micro-fiber tensile tester that uses a simple bridge means and a cooperatively associated direct reading means which allows more efficient operation of the micro-fiber tester than heretofore thought possible.

A further object of the present invention is to provide a read-out device for a micro-tensile tester which is relatively simple and economical in construction, yet accurate in operation.

Another object of the present invention is to provide a read-out device for utilization with a micro-tensile tester which utilizes a bridge means having predetermined symmetry in which electrical losses are cancelled, thereby eliminating the necessity for an accompanying dissipation factor balance means.

Yet another object of the present invention is to provide a read-out device for use with a micro-tensile tester which permits direct reading of the elongation of a 1 mm. fiber with a precision of $\pm 0.02\%$.

A further object of the present invention is to provide a read-out device for utilization with a micro-fiber tensile tester having optimum reliability characteristics afforded by a construction having a minimum number of parts.

The present invention, in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawings.

The invention resides in the novel construction, combination, arrangement, and cooperation of elements as hereinafter described and more particularly as defined in the appended claims.

The appended drawings illustrate an embodiment of the present invention constructed to function in the most advantageous modes devised for the practical application of the basic principles involved in the hereinafter described invention.

In the drawings:

FIGURE 1 is a top view of the present invention with selected segments thereof cut away illustrating the cooperative relation of several of the components of the read-out device for use with a micro-fiber tensile tester.

FIGURE 2 is an electrical schematic of a bridge means utilized as a component of the present invention.

FIGURE 3 is an exploded perspective view of the several components of the present invention including a variable read-out capacitor used as an integral part of the present invention.

Generally speaking, the means and methods of the present invention relate to a read-out means for use with a micro-fiber tensile tester. The read-out means is designed for use in a leg of a bridge circuit. The bridge circuit also includes a fiber elongation sensing capacitor in another leg thereof. The read-out device is direct reading in terms of elongation of a fiber. The read-out means includes a read-out capacitor having a movable plate and a fixed plate. A means is utilized for biasing the movable plate of the capacitor away from the fixed plate. A plurality of displaceable means for reducing axial motion are coupled in sequence. One of the plurality of the displaceable means is used for biasing the movable plate of the read-out device toward the fixed plate thereof. An indicia carrying means is utilized for adjusting the position of the movable plate with respect to the fixed plate of the read-out capacitor through the plurality of displaceable means to correspond to the position of the plates of the sensing capacitor so as to balance the bridge circuit. The indicia carrying means is used for indicating the elongation of the fiber.

More particularly, the present invention pertains to a direct read-out means for use in a leg of a bridge circuit of a tensile testing apparatus. The bridge circuit also includes a fiber elongation sensing capacitor in another leg thereof. The read-out means includes a read-out capacitor having a movable plate and a fixed plate in spaced, parallel relationship. A spring means is used for biasing the movable plate of the capacitor away from the fixed plate of the capacitor. A plurality of displaceable link means are coupled in sequence and one link thereof is used for biasing the movable plate toward the fixed plate of the read-out capacitor. A spring loaded clamp means provides a pivot point for another of the link means. A micrometer means includes an indicia carrying thimble, an indicia carrying sleeve, and a spindle. The spindle is coupled to a first link of the link means. The micrometer biases the link means such that the one link biases the movable plate toward the fixed plate of the read-out capacitor. The micrometer, therefore, is used to adjust the position of the movable plate with respect to the fixed plate of the read-out capacitor through the plurality of link means so as to correspond to the position of the plates of the sensing capacitor. The link means reduces the axial motion of the spindle of the micrometer. When the distance between the plates of the read-out capacitor and the sensing capacitor are the same, the indicia of the micrometer displays the elongation of the fiber.

Referring now to FIGURE 1 of the drawing, the read-out means 10 for utilization with a micro-fiber tensile tester (not shown) is illustrated in a top view. The direct read-out device of the present invention is intended as a substitute for the indirect read-out device disclosed in a copending application, Ser. No. 434,849, filed Feb. 24, 1965, entitled, "Micro-Tensile Testing Machine," and assigned to P. R. Mallory & Co. Inc., the assignee of the present invention. The aforementioned tensile testing machine is comprised of a measuring fixture which incorporates a capacitive element for sensing of fiber elongation, together with a precision capacitance bridge, an oscillator and a null detector. Predetermined loads are applied to the fiber under investigation through an analytical balance, and elongations of the fiber are evaluated by manually balancing the capacitance bridge. The means and method of the aforementioned copending application performed well for the intended purpose, however, the capacitance bridge utilized therein is expensive, and the data obtained therefrom required to be translated from an electrical measure to the more meaningful measure of length before the actual alteration in length of the fiber is obtained. The present invention contemplates replacing the capacitance bridge means of the aforementiond copending application so as to eliminate the necessity for the use of conversion tables that convert the observed electrical measure to the measure of length.

A micrometer 11 is coupled to a variable read-out capacitor 12 through a plurality of displaceable link means 13. The micrometer is utilized to accurately vary the value of the capacitance of the read-out capacitor 12 by displacing the knurled knob 14 of the micrometer with a rotational movement. The knurled knob carries a thimble 15 that is subdivided into fifty major divisions around its outer periphery. The thimble fits over a sleeve 16 that has a plurality of longitudinal indicia indicating the longitudinal location of thimble with respect to the sleeve. In addition, the thimble is coupled to a spindle 17 such that either clockwise or counterclockwise displacement of the thimble is translated into a longitudinal displacement of the spindle. The purpose of the micrometer is to magnify small displacements by use of an accurately machined screw thread. Each full revolution of the thimble moves the spindle 0.5 millimeter. As disclosed hereinbefore, the thimble is divided into 50 major divisions, such that each corresponds to 0.01 millimeter and minor divisions thereon correspond to 0.002 millimeter. The displacement of the spindle is ascertained by the sum of the readings of the sleeve and the thimble scales.

The micrometer is fixedly coupled to a mounting plate 18 by a suitable bracket means 19, each of which may be fabricated from any suitable metal such as steel or the like. The bracket means is coupled to the mounting plate by a plurality of bolts 20 turned into threaded apertures (not shown) in the mounting plate.

A recessed block means 21 is coupled to the extremity of spindle of the micrometer so that displacement of the spindle also displaces the recessed block means in a like fashion. As illustrated in FIGURE 1, the block means is coupled to the spindle by means of any suitable device such as by a bolt turned into a threaded aperture. An axial recess 27 of the block means includes a V-shaped extremity which serves as a seat for a spherical pivot means 22. Biased against the spherical pivot means is a first link 23 having reduced diameters 24 and 24' at either end thereof as shown in FIGURE 1. The shoulder formed by reduced diameter 24 rides against a side of the recessed block means whereas the reduced diameter projects into the recess of the block means and abuts the spherical pivot means 22.

The other reduced diameter 24' of the first link projects into the recess 28 of a second link 25 and abuts a spherical pivot means 26. The recess of the second link is perpendicular to the longitudinal axis of the second link and the recess 28 includes a conical-shaped seat for the spherical pivot means 26. The shoulder of the first link formed by the reduced diameter 24' rests on the portion of the second link surrounding the recess 28 of said link. In spaced, parallel relationship with the recess 28 and formed in the second link is a recess 29 that includes a substantially conical-shaped extremity. The conical-shaped extremity 29 serves as a seat for a spherical pivot means 30.

An apertured spring loaded clamp means 31 is fixedly mounted to the mounting plate 18 by any suitable means such as by bolts or the like. The spring loaded clamp means is fabricated from any suitable metal such as steel or the like. The spring loaded clamp includes a U-shaped bracket means 32 which is fixedly coupled to the mounting plate by any suitable means such as by bolts or the like turned into threaded apertures. The U-shaped mounting bracket serves as a seat for bolts 33, 33', and 33" that are turned into threaded apertures formed in the bracket. The bolts 33, 33' and 33" carry a plate 34 that is spring biased toward the U-shaped bracket by compressed spiral spring 35, 35' and 35". It will be noted that the plate 34 substantially overlays the aperture of the U-shaped means and that the plate includes a conical-shaped notch 36 positioned substantially opposite a V-shaped notch 37 formed in the U-shaped bracket 32. A spherical pivot 38 is seated between the conical shaped and the V-shaped notches 36 and 37 respectively as shown in FIGURE 1. In spaced, parallel relationship with the spherical pivot 38 is a like spherical pivot 39. The spherical pivot 39 is seated in a cup-shaped recess 40 in the bracket means 32 and a similar cup-shaped recess (not shown) in the plate 34. It is seen that the spring biased clamp 31 substantially prevents longitudinal displacement of the second link 25, however, the spring biased clamp does allow arcuate displacement of the second link.

A third link 60 includes several components as shown in FIGURE 1 and as disclosed herein later. The spherical pivot 30 is seated in the conical-shaped portion of the recess 29. The spherical pivot 30 is utilized to longitudinally bias a cylindrical means 40 having cup-shaped recesses 40 and 40' at either extremity. Another spherical pivot 41 is seated between the cylindrical means 40 and a means 42. These aforementioned components constitute the third link 60.

A rod means 43 is fixedly coupled to a movable capacitor plate 44 by means of a set screw and is biased against an extremity of means 42. A fixed capacitor plate 45 of the read-out capacitor is in spaced, parallel relationship with the movable capacitor plate. The plate 45 is fabricated from any suitable ceramic or plastic material and includes thereon conductive semicircular sections 45' and 45" fabricated from any suitable metal such as aluminum or the like. The air gap between the fixed and the movable plates is utilized as a dielectric for the capacitor. A plurality of bolts are utilized to couple the fixed plate of the read-out capacitor means to a capacitor mounting bracket 46. As shown in FIGURE 3 the rod 43 passes through the capacitor mounting bracket and the fixed capacitor plate without engaging either the bracket or the fixed capacitor plate. It will also be noted that the rod abuts with the third link as illustrated in FIGURE 1.

An apertured mounting bracket 47 is fixedly coupled to the mounting plate 18 by any suitable means such as by bolts or the like. An apertured bushing means 48 interfits with the aperture of the mounting bracket 47 so as to predeterminately space the rod 43 from the side walls of the aperture in the mounting bracket 47. The rod is longitudinally spring biased in the direction of arrow 58 by leaf spring means 57 fixedly coupled to the mounting bracket 47 by any suitable means such as by bolts or the like. The leaf spring is utilized to store energy and to subsequently release the energy so stored when a particular condition exists.

Electrically conductive semicircular section 45' of the fixed plate of the capacitor 12 is coupled to an electrically conductive lead 49 and the electrically conductive semicircular section 45 of the fixed plate is coupled to an electrically conductive lead 49' by means of appropriate bolts coupling the fixed plate of the capacitor to the capacitor mounting bracket. Each of the bolts and cooperatively associated leads are electrically insulated from the mounting bracket by a bushing 59 fabricated from any suitable insulative material such as rubber or the like.

The variable read-out capacitor 12 constitutes a leg of the capacitance bridge means 50. A second leg of the bridge means utilizes a variable sensing capacitor 51. The sensing capacitor and the test fixture cooperatively associated therewith are like those illustrated in the hereinbefore mentioned copending application. The remaining two legs of the bridge utilize the center tapped secondary winding 53 of a balanced inductance means 52. The variable read-out capacitor 12 is coupled in series with a secondary winding portion 54 of the center tapped secondary winding. The variable sensing capacitor 51 is coupled in series with a secondary winding portion 55 of the center tapped secondary winding. Electrically coupled between the respective variable capacitors and the center tap of the secondary winding is any suitable null indicator 56. As shown in FIGURE 2, the center tap of the secondary winding is electrically coupled to ground through any suitable electrically conductive conduit means. The primary winding of the inductance means is electrically connected to any suitable alternating current source 57 which may be 60 cycle.

The variable capacitors 12 and 51, the former a component of the read-out device and the latter a component of the test fixture respectively, are electrically coupled together by coaxial cables that are carefully cut for electrical similarity. The bridge will be balanced, that is, no detectable reading observed on the null indicator, when the capacitance values of the respective variable capacitors are identical. It will be noted that the bridge will be in "balance" when the separation between the plates of the respective capacitors are identical. Any change in the separation of the plates in the sensing variable capacitor 51 of the tensile tester (not shown) will be noted on the null indicator as a bridge unbalance, which may be corrected by a corresponding alteration in the separation of the capacitor plates of the read-out means. The micrometer converts the alteration of the position of the read-out capacitor's plates to an axial displacement that may be read conveniently on the micrometer. The symmetry of the bridge assures that the electrical losses substantially cancel each other thereby eliminating the necessity for a dissipation factor balance means.

With the hereinbefore structural disclosure in mind and by continued reference to the several figures of the drawings, the following analysis of the operation of the present invention will further serve to amplify the novelty of the present invention.

Assuming that the sensing variable capacitor 51 has its plates displaced by the axial loading of a fiber under test and that the plates of the sensing capacitor have attained a steady state, a reading is obtained across the null indicator showing that the bridge is in a state of unbalance. As disclosed hereinbefore, the bridge may be balanced by varying the distance between the plates of the read-out capacitor to correspond to the distance separating the plates of the sensing capacitor.

Assuming that the distance between the plates of the sensing capacitor is greater than the distance separating the plates of the read-out capacitor, the distance between the plates of the read-out capacitor may be made greater by rotating the knurled knob of the micrometer in the clockwise direction. The force exerted against the rod means 43 is lessened thereby allowing the release of some of the energy stored in the leaf spring means 57. The rod means is displaced in the direction of arrow 58 by the action of the released energy of the leaf spring. The displacement of the rod means 43 is continuous until a steady state condition is again achieved between the force exerted by the micrometer through the link means against the movable capacitor plate is equal and opposite to the force exerted by the leaf spring through the rod to the movable capacitor plate.

Assuming that the plates of the read-out capacitor are now further apart than the plates of the sensing capacitor, the knurled knob is rotated in the counterclockwise direction. The displacement of the spindle of the micrometer is in the direction of arrow 59. As disclosed hereinbefore, the block means is fixedly connected to the spindle and therefore is also displaced in the direction of arrow 59. The first link 23 of the plurality of link means is also displaced in the direction of arrow 59 by the force exerted against the second link by the spring loaded clamp 31. The second link is arcuately displaced about a point determined by the spring loaded clamp. The extremity of the second link cooperatively associated with the first link is positioned further away from the extremity of the second link cooperatively associated with the spring loaded clamp and, therefore, is displaced through an arc greater in magnitude than that of the extremity associated with the spring loaded clamp. The displacement of the spherical pivot means 30 and hence means 42 is also in the direction of arrow 59 thereby displacing the movable plate of the read-out capacitor toward the fixed plate thereof. The rod means 43 is likewise displaced in the direction of arrow 59 thereby displacing the leaf spring means so as to store energy therein. The knurled knob is thereafter rotationally displaced until a null indication is read on the null indicator.

The plurality of links between the micrometer and the read-out capacitor have been designed so as to provide a 10 to 1 ratio of input displacement to output displacement. This ratio permits a direct reading of the plate separation to ±0.0002 mm., or, for a 1 mm. long fiber, a precision of ±0.02 percent. It will be understood that the ratio described is merely illustrative and not limiting in scope since the aforementioned ratio may be varied to any more convenient ratio dependent only on the accuracy desired.

While the invention is illustrated and described in an embodiment, it will be understood that modifications and variations may be effected without departing from the scope of the novel concepts of this invention and as set forth in the appended claims.

Having thus described our invention, we claim:

1. A read-out means for use in one leg of a bridge circuit of a tensile testing apparatus, said bridge circuit including an element elongation sensing capacitor in another leg thereof, said read-out means comprising: a read-out capacitor including a movable plate and a fixed plate; means connected to said movable plate biasing said movable plate of said capacitor away from said fixed plate; a plurality of displaceable means for reducing motion coupled in sequence, one of said plurality of means abutting said movable plate and biasing said movable plate toward said fixed plate of said capacitor; and an indicia carrying means including a micrometer having a spindle connected to another one of said displaceable means for adjusting the position of said movable plate with respect to said fixed plate of said capacitor through said plurality of displaceable means, said micrometer having means for displaying the elongation of an element.

2. A read-out means according to claim 1 in which said means for biasing said movable plate of said capacitor away from said fixed plate includes rod means fixedly connected to said movable plate and projecting therefrom and spring bias means abutting said rod so as to bias said movable plate away from said fixed plate of said capacitor through said rod means.

3. A read-out means according to claim 2 in which said rod means projects through an aperture in said fixed plate.

4. A read-out means according to claim 1 in which said plurality of displaceable means include three link means coupled together by a plurality of coupling means in a U-shaped fashion, a first link means coupled to said spindle of said micrometer and displaced by movement of said spindle, a second link means for reducing said displacement of said first link means and coupled to said first link means, and a third link means abutting said movable plate biasing said plate toward said fixed plate of said capacitor.

5. A read-out means according to claim 4 in which said first link means is axially displaced by displacement of said spindle, said second link means pivotally displaced by said axial displacement of said first link means, and said third link means is axially displaced by said pivotal displacement of said second link means so as to bias said movable plate toward said fixed plate of said capacitor.

6. A read-out means according to claim 4 including a spring biased clamp means coupled to said second link means providing a pivot point for said second link means.

7. A read-out means according to claim 4 in which said plurality of coupling means includes spherical pivot means for reducing friction between said link means.

8. A read-out means according to claim 1 in which said fixed plate of said read-out capacitor includes a plastic disc having conductive semicircular sections coated on the surface of said disc in spaced parallel relationship with said movable plate of said read-out capacitor.

9. A read-out means according to claim 8 in which one of said conductive semicircular sections forms an input to said read-out capacitor and the other of said conductive semi-circular sections forms an output of said read-out capacitor.

10. A direct read-out means for use in one leg of a bridge circuit of a tensile testing apparatus, said bridge circuit including a fiber elongation sensing capacitor in another leg thereof, said read-out means comprising: a read-out capacitor including an axially movable plate and an apertured fixed plate in spaced parallel relationship; means including rod means connected to said movable plate and projecting therefrom through said aperture of said fixed plate and spring bias means abutting an extremity of said rod means so as to axially bias said movable plate of said capacitor away from said fixed plate through said rod means; a plurality of displaceable means for reducing motion including three link means coupled together by a plurality of coupling means in U-shaped fashion, a third one of said link means abutting said movable plate and axially biasing said movable plate toward said fixed plate of said capacitor; and an indicia carrying means including a micrometer having a spindle connected to a first one of said link means for adjusting the position of said movable plate with respect to said fixed plate of said capacitor through displacement of said three link means, said micrometer having means displaying the elongation of a fiber.

References Cited by the Examiner

UNITED STATES PATENTS

| | | | |
|---|---|---|---|
| 1,625,234 | 4/1927 | Wittgenstein | 74—10.9 |
| 2,179,068 | 11/1939 | Sprague | 317—249 |

LEWIS H. MYERS, *Primary Examiner.*

E. GOLDBERG, *Assistant Examiner.*